INVENTORS
Richard L. Morris
Frederick H. Detweiler
BY
Curtis, Morris & Safford
ATTORNEYS July 24, 1951

R. L. MORRIS ET AL

GROUND POTENTIAL AND LINE INTERFERENCE CORRECTING APPARATUS AND METHOD 2,561,401

Filed Jan. 11, 1949

4 Sheets-Sheet 2

INVENTORS
Richard L. Morris
Frederick H. Detweiler
BY
Curtis, Morris + Safford
ATTORNEYS July 24, 1951 R. L. MORRIS ET AL 2,561,401

GROUND POTENTIAL AND LINE INTERFERENCE CORRECTING APPARATUS AND METHOD

Filed Jan. 11, 1949 4 Sheets-Sheet 3

INVENTORS
Richard L. Morris
Frederick H. Detweiler
BY
Curtis, Morris & Safford
ATTORNEYS INVENTORS
Richard L. Morris
Frederick H. Detweiler
BY
Curtis, Morris + Safford
ATTORNEYS Patented July 24, 1951

2,561,401

UNITED STATES PATENT OFFICE 2,561,401

GROUND POTENTIAL AND LINE INTERFERENCE CORRECTING APPARATUS AND METHOD

Richard L. Morris, South Ozone Park, and Frederick H. Detweiler, Wantagh, N. Y., assignors to Telautograph Corporation, New York, N. Y.

Application January 11, 1949, Serial No. 70,318

11 Claims. (Cl. 178—69)

This invention relates to signal transmission, and more in particular to compensating for interference potentials in communication circuits such as the circuits connecting a sending station to a receiving station of a telescriber system.

In such communication circuits, one side of each circuit is formed by a wire or line and the other side is formed by ground; that is, each circuit has a wire extending from the sending to the receiving station and then a return connection is provided by two ground connections respectively at the two stations. With circuits of this character a great deal of difficulty has been encountered because of interference with the communication signals by stray electric currents which are caused to flow through the circuits by potentials which originate outside the communication circuits and which exist because the signals circuits include ground connections. These potentials include potentials originating in the earth's surface and interference currents due to leakage and induction into the circuit lines, and are referred to as "ground potentials."

One of the three main types of these "ground potentials" is the potential differences which exist between the two points on the earth's surface where the ground connections are made. Such potential differences may be relatively constant, but in many instances they vary and may in fact reverse polarity frequently. While a constant potential difference of this character may be compensated for, it has been difficult to compensate for such differences where either the magnitude or the polarity changes. With equipment such as telescriber systems, these variations in the magnitude of the potential differences may be so great that the reproductions at the receiving station are thoroughly unsatisfactory. Furthermore, even if such a potential difference merely shifts at a slow rate, the reproductions at the receiving station may move off the writing field; thus, at times a large outside margin of the writing field has been blocked off and not used so as to insure that all reproductions will appear within the writing field at the receiving station.

Another serious type of ground potentials are those resulting from potentials induced in the side of the circuit formed by the wire. For example, such wires are normally enclosed in a cable with other wires which may carry other types of signal or control currents, and the current flow in the other wires may be of sufficient magnitude to induce an appreciable potential in the circuit wire. Where circuits are formed by a pair of wires or lines in a single cable, these induced potentials are cancelled out; but where the return side or connection of a circuit is formed by ground, these induced potentials may be a very serious problem.

The other important type of ground potential interference is that caused by leakage currents from adjacent electrical circuits which, for example, may also be formed by a single wire and ground. Where these leakage currents are pulsating or alternating current, they may be considered the same as a number of high resistance generators connected between the signal circuit wire and ground.

Arrangements have been provided in the past for correcting or compensating for these ground potentials or for reducing or eliminating their effects, but these various arrangements have not been completely satisfactory for all installations. For example, filters and wave traps have been provided to trap out specific frequencies, but generally this is unsatisfactory with equipment such as that referred to above, because such arrangements tend to interfere with the signals so as to prevent fidelity of reproduction at the receiving station; this fidelity is dependent upon having the equipment responsive to slow and fast variations in the signal over a wide range as the movement of the writing stylus at the sending station changes in rate and direction of movement. For this reason, filters and wave traps are not used except where the ground potentials involve only potential changes at rates entirely outside the range of operation of the equipment. Furthermore, with circuits such as those referred to above, attempts to reduce the flow of these leakage currents to ground at the sending station causes these currents to be diverted to the receiving station so that the undesirable interference increases.

It is an object of the present invention to provide means to compensate or correct for ground potential interference without the difficulties which have been encountered in the past. It is a further object to compensate or correct for such interference in circuits such as those referred to above, particularly in a telescriber system where two separate circuits are used. It is a further object to provide for the above in a thoroughly practical and dependable manner at minimum expense for manufacture and operation. These and other objects will be in part obvious and in part pointed out below.

The invention accordingly consists in the features of construction, combination of elements, arrangements of parts and in the several steps and relation and order of each of the same to one or more of the others, all as will be illustratively described herein, and the scope of the application of which will be indicated in the following claims.

In the illustrative embodiments of the present invention, electrical amplitude transmitters and receivers are represented as those of telescriber systems, although it is understood that this is illustrative only, and the broader aspects of the invention are applicable to other systems such as telephone systems, telegram systems, facsimile systems, telemetering systems, and the like.

Figure 1:
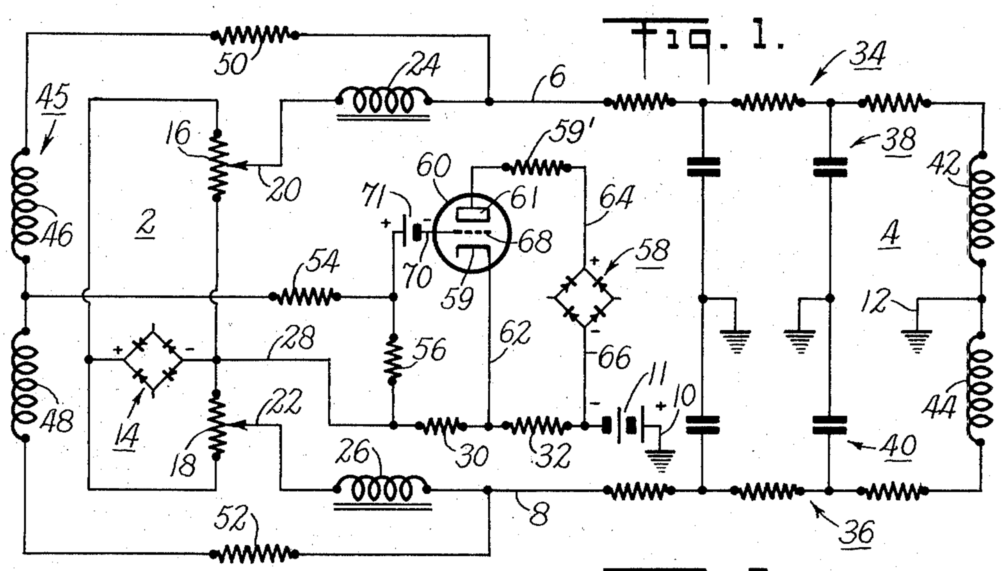
Figure 1 is a simplified schematic showing of one embodiment of the invention.

Referring particularly to Figure 1 of the drawings, there is shown at the left a telescriber transmitter 2 and at the right a telescriber receiver 4 connected to the transmitter by a pair of wires 6 and 8 which extend from the transmitting station to the receiving station. Transmitter 2 is connected to ground through a ground connection 10 and receiver 4 is connected to ground at 12. The transmitter has a source of direct current in the form of a rectifier unit 14 (here and elsewhere this rectifier unit is connected to a source of alternating current), the two sides of which are connected across to the two potentiometer resistors 16 and 18. Resistor 16 has a contact slide 20 which is connected through a choke coil 24 to line 6, and during the operation of the apparatus, this slide is moved to produce a variable potential in the signal circuit of line 6. Resistor 18 has a similar contact 22 which is connected through a choke coil 26 to line 8 and this slide is moved to produce a variable potential in the circuit of line 8.

The negative common terminal of resistors 16 and 18 is connected through a line 28, a pair of resistors 30 and 32 and a battery 11 to the ground connection 10 referred to above. Thus, a pair of circuits is provided between transmitter 2 and receiver 4 with each circuit being formed by a line or metallic channel extending between the stations and a return connection through ground. Lines 6 and 8 have distributed resistances represented schematically respectively at 34 and 36, and there is mutual capacitance between the lines and to ground which is represented at 38 and 40. Receiver 4 is represented by a pair of responding coils 42 and 44 which are at times referred to as "buckets." One side of coil 42 is connected through line 6 and choke coil 24 to slide 20, and the other side of coil 42 is connected through ground connection 12, the ground side of the circuit, ground connection 10, battery 11, resistors 32 and 30 and line 28 to the negative side of resistor 16.

Assuming that there is no ground potential interference and ignoring for the time being the effect of resistors 32 and 34 and battery 11, the position of slide 20 determines the signal potential and this is impressed across coil 42. Thus, as slide 20 is moved a varying current flows through the signal circuit and including coil 42 and a varying flux is created in the magnetic field of this coil. Similarly the flux in the magnetic field of coil 44 is varied in accordance with the position of slide 22. These varying fluxes are utilized to reproduce at receiver 4 the movements of the stylus (not shown) at the transmitter 2.

At the transmitting station there is a monitor receiving unit 45 which is represented by a pair of coils 46 and 48 connected respectively through resistors 50 and 52 to the transmitting ends of lines 6 and 8. Coils 46 and 48 are the signal responsive coils of a telescriber receiver identical with receiver 4 at the receiving station. The common side of these two coils 46 and 48, corresponding to the grounded side of coils 42 and 44, is connected through a pair of resistors 54 and 56 to line 28 which, as indicated above is connected to the negative sides of resistors 16 and 18. Resistors 50 and 52 are equal respectively to the distributed resistances 34 and 36 in lines 6 and 8. Resistors 30 and 56 are each of 50 ohms, and resistors 32 and 34 are each of 250 ohms. Therefore, a monitor system is set up at the transmitting station which is formed by two circuits electrically identical with the respective circuits of coils 42 and 44, and when the stylus at the transmitter station is manipulated, reproductions are made at the receiver 4 and also at the monitor receiver 45.

The operation referred to above is upon the assumption that there is no ground potential interference. However, if any ground potential interference is present the reproduction at receiver 4 will be different from that at transmitter 2 and receiver 45. In accordance with the present invention such interference of the type caused by there being a difference in the potential of the earth's surface at the transmitting and receiving stations, is corrected so that the reproductions at receiver 4 are almost identical with those at the transmitting station. This correction is effected by producing a correcting potential which is substantially equal and opposite to the interfering ground potential. The operation is automatic and the correction equipment does not change the normal operation when no ground potential interference exists.

The correcting potential is impressed across resistor 32 and it is produced by a correcting circuit including a source of direct current in the form of a rectifier unit 58, a resistor 59', and a control vacuum tube 60 having a cathode 59 a grid 68 and a plate 61. The correcting circuit extends from one side of resistor 32 through a line 62, tube 60, resistor 59', and a line 64 to rectifier unit 58, and thence through a line 66 to the other side of the resistor. The grid 68 is connected through a line 70 having a negative bias battery 71 therein to the juncture of resistors 54 and 56. The arrangement is such that battery 11 maintains the ground side of resistor 32 at a relative low negative potential when there is no ground potential interference and grid 68 has a bias to permit a flow through the plate circuit so as to maintain a potential drop across resistor 32 which is equal and opposite to that of battery 11. This bias grid 68 is maintained by battery 71 which has its negative side connected to the grid, and its positive side connected through resistors 56 and 30 to cathode 59. When there is no ground potential current flowing, the signal current flowing through resistor 30 is equal to the signal current flowing through resistor 56 of the monitor circuit, and therefore, the potential drops across these two resistors is the same and lines 62 and 70 are at the same potential. If a ground potential current starts to flow through the signal circuits then the current flowing through resistor 30 is different from the current flowing through resistor 56 and the corresponding difference in the potential drops across these resistors causes line 62 to have a different potential than line 70. This causes a grid bias which is added algebraically to the bias produced by battery 71, with the result that the current flow through tube 60 changes. Specifically if the ground potential is of the same sense as battery 11, then the current flow through tube 60 is increased, and if the ground potential is of the opposite sense then the current flow through the tube is decreased. The potential drop across resistance 32 is added to or substracted from that of battery 11 and the value of this potential drop is such at all times as to correct for the ground potential interference.

Figures 2, 3:
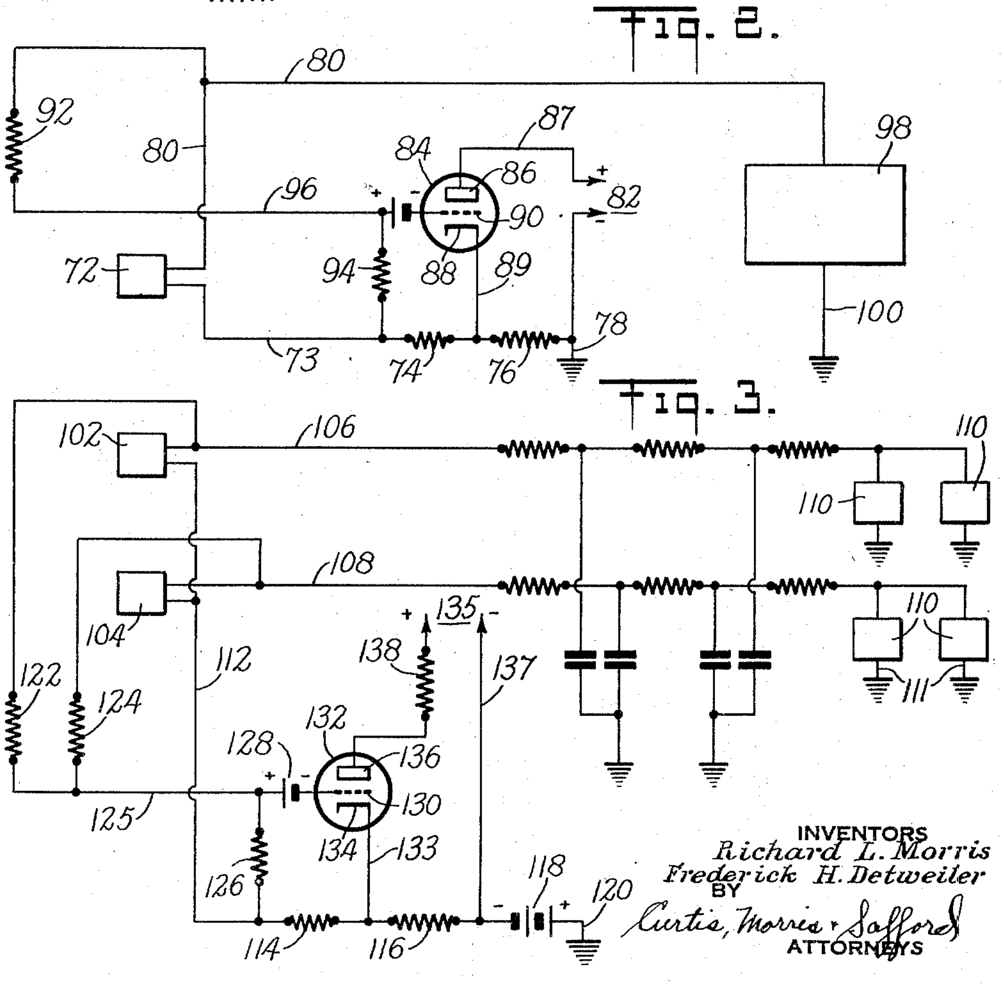
Figures 2 and 3 are similar to Figure 1, but illustrate other embodiments of the invention.

In the embodiment of Figure 2 a simplified arrangement is shown wherein there is no receiver at the transmitting station and here the transmitter is in the form of an electrical amplitude transmitter 72. Transmitter 72 is connected at one side through resistors 74 and 76 to a ground connection 78, and the other side to a line 80. The correction ground potential circuit is formed by a source of direct current indicated at 82 which has its negative side connected to line 78, a tube 84 which has its plate 86 connected through a line 87 to the positive side of the power source and its cathode 88 connected through a line 89 to the juncture of resistors 74 and 76. The grid 90 is connected to a monitor circuit formed by a high resistance resistor 92 and a low resistance resistor 94 the resistance of which is equal to that of resistor 74. One side of resistor 92 is connected to line 80 and the other side is connected through a line 96 to grid 90 and also through resistor 94 to line 73 which, as indicated above, is the grounded side of transmitter 72.

At the receiving station receiver 98 is connected to ground through a ground connection 100. In this embodiment, it is assumed that the ground potential interference is of only one polarity; namely, it has the effect of a battery of rather varying high potential with its positive side connected to ground connection 78 and with its negative side connected to ground connection 100. Assuming that no ground potential interference exists the variable potential produced by transmitter 72 is transmitted through line 80 and the return ground connections to receiver 98. Therefore, a varying current flows through the signal circuit between the transmitter and the receiver and simultaneously a varying current flows through the monitor circuit of impedance 92 and resistor 94. However, the high impedance of this circuit maintains this latter current flow at a very low level compared with the flow through the signal circuit.

The arrangement is such that grid 90 is maintained at a sufficient bias to prevent current flow through the correction circuit whenever the current flow through the monitor circuit has the proper relationship to the current flow through the signal circuit. That is, whenever a signal current flows through resistor 74 it causes cathode 88 to be at a potential which is the same as the potential produced at grid 90 by the corresponding flow of current in the monitor circuit. Therefore, the relationship is such that the grid prevents the flow of current through the plate or correcting circuit. If ground potential appears it will tend to reduce the flow of current through the signal circuit, but it will not interfere with the flow through the monitor circuit. Therefore, the cathode tends to become less positive in potential with respect to the grid with the result that the current starts to flow through the correction circuit. This flow produces a potential drop across resistor 76 which is opposite and substantially equal to the ground potential.

With the arrangement of Figure 2 the impedance of resistor 92 is of such value as to give the desirable operating results and preferably is sufficiently high to prevent any appreciable flow of current. In this way, substantially the entire signal current flows through the signal circuit. The resistance of transmitter 72 may be high therefore and yet the ground potential currents will tend to flow through the signal circuit including transmitter 72 rather than flow through the monitor circuit. In the embodiment of Figure 2 no impedance is shown in the signal line, but of course, there will be resistance and there may be other impedances.

In the embodiment of Figure 3 two signal transmitters 102 and 104 are connected respectively through lines 106 and 108 to a plurality of receivers 110 located at remote receiving stations and grounded at 111. Lines 106 and 108 are indicated as having resistance and capacitance similar to the lines of the embodiment of Figure 1. The negative side of each of the transmitters is connected through a line 112 and a pair of resistors 114 and 116 and a battery 118 to a ground connection 120. Transmitter 102 has a monitor circuit formed by a high impedance resistor 122 and transmitter 104 has a similar monitor circuit formed by a similar resistor 124. These monitor circuits are connected to a line 125 and thence through a resistor 126 to line 112. Line 125 is connected through a bias battery 128 to the grid 130 of a tube 132 which has a cathode 134 and a plate 136. A source of direct current 135 is connected at its positive side through a resistor 138 to plate 136 and at its negative side through a line 137 to a juncture of resistor 116 and battery 118. Cathode 134 is connected through a line 133 to the juncture of resistors 114 and 116.

The operation of the system of Figure 3 is similar to that of Figure 1. It will be seen that when no ground potential interference exists the signals from transmitters 102 and 104 will be received by their respective receivers. However, when a ground potential interference condition is created a correcting potential is impressed across resistor 116 of sufficient magnitude to correct for the interference potential. In this embodiment two transmitters are shown each with its own line and each with two receivers, and it is understood that three or more transmitters or receivers or both can be used when desirable.

Figure 4:
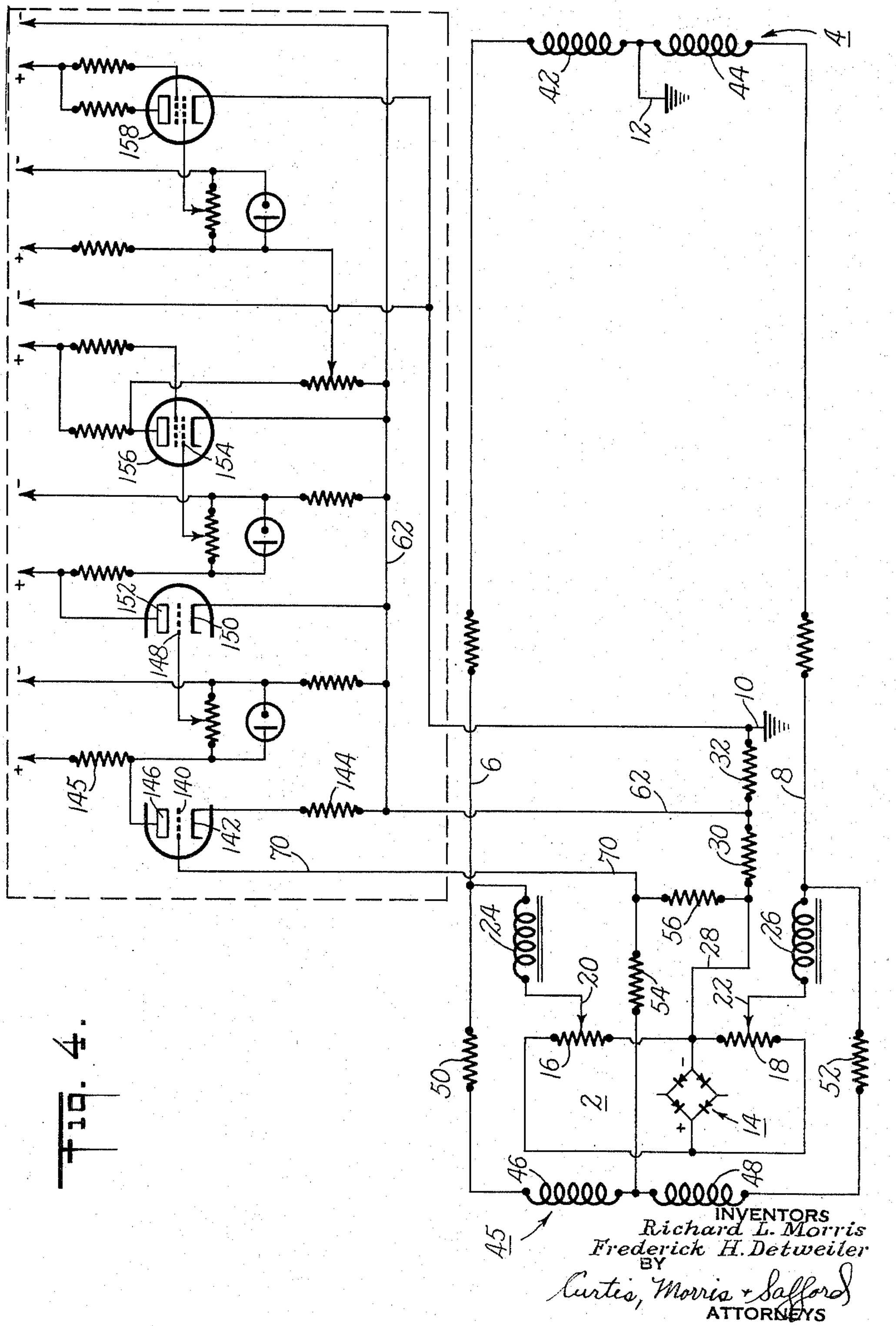
Figure 4 is a more detailed representation of another embodiment of the invention.

In the embodiment of Figure 4 the arrangement is similar to that of Figure 1 except that a push-pull correction potential source is provided and no battery 11 is provided in series with the ground connection 10. In Figure 4 the transmitter and receiver elements are numbered corresponding to those of Figure 1. When there is no ground potential interference, the operation is identical with that of the embodiment of Figure 1, and when there is ground potential interference line 70 which is at the juncture of resistors 54 and 56 is at a different potential from that of line 62 which is at the juncture of resistors 30 and 32.

Line 70 is connected to the grid 140 of a first amplifier circuit which has a cathode 142 connected through a resistor 144 to line 62 and a plate 146 connected through a resistor 145 to the positive side of a direct current source. The correction signal in the form of a bias on grid 140 is amplified and impressed upon the grid 148 of a second amplifier circuit which has its cathode 150 connected to line 62 and its plate 152 connected to the positive side of a source of a direct current. The signal is therefore again amplified, and it is then impressed upon the grid 154 of the first tube 156 of a push-pull circuit which has a second tube 158, the bias of which is taken from the output of the first tube. Each of the amplifier stages and tube 156 has a voltage regualtor tube which holds a constant voltage on its output.

With the embodiment of Figure 4 there is no potential drop impressed across resistor 32 by the correcting circuit except when ground potential interference exists. When ground potential interference exists the control bias on grid 140 causes the proper one of tubes 156 and 158 to impress the proper correcting potential on resistor 32. With this push-pull circuit, the operation is automatic and as indicated above, no series battery is provided in the ground connection circuit. In Figure 4 the schematic showing of line capacitance is omitted.

Figure 5:
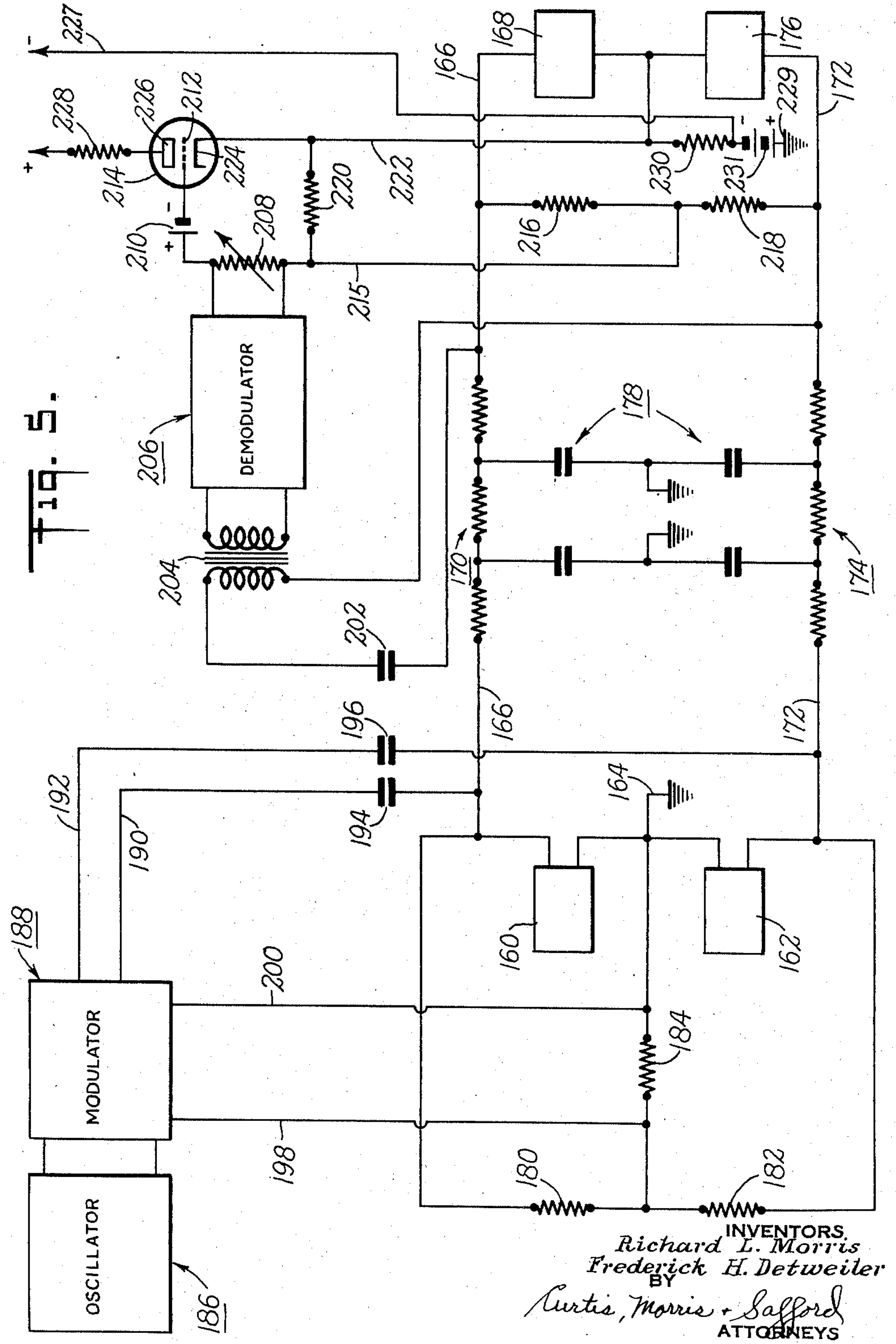
Figure 5 is a view similar to Figure 3 showing another embodiment of the invention.
Figure 6:
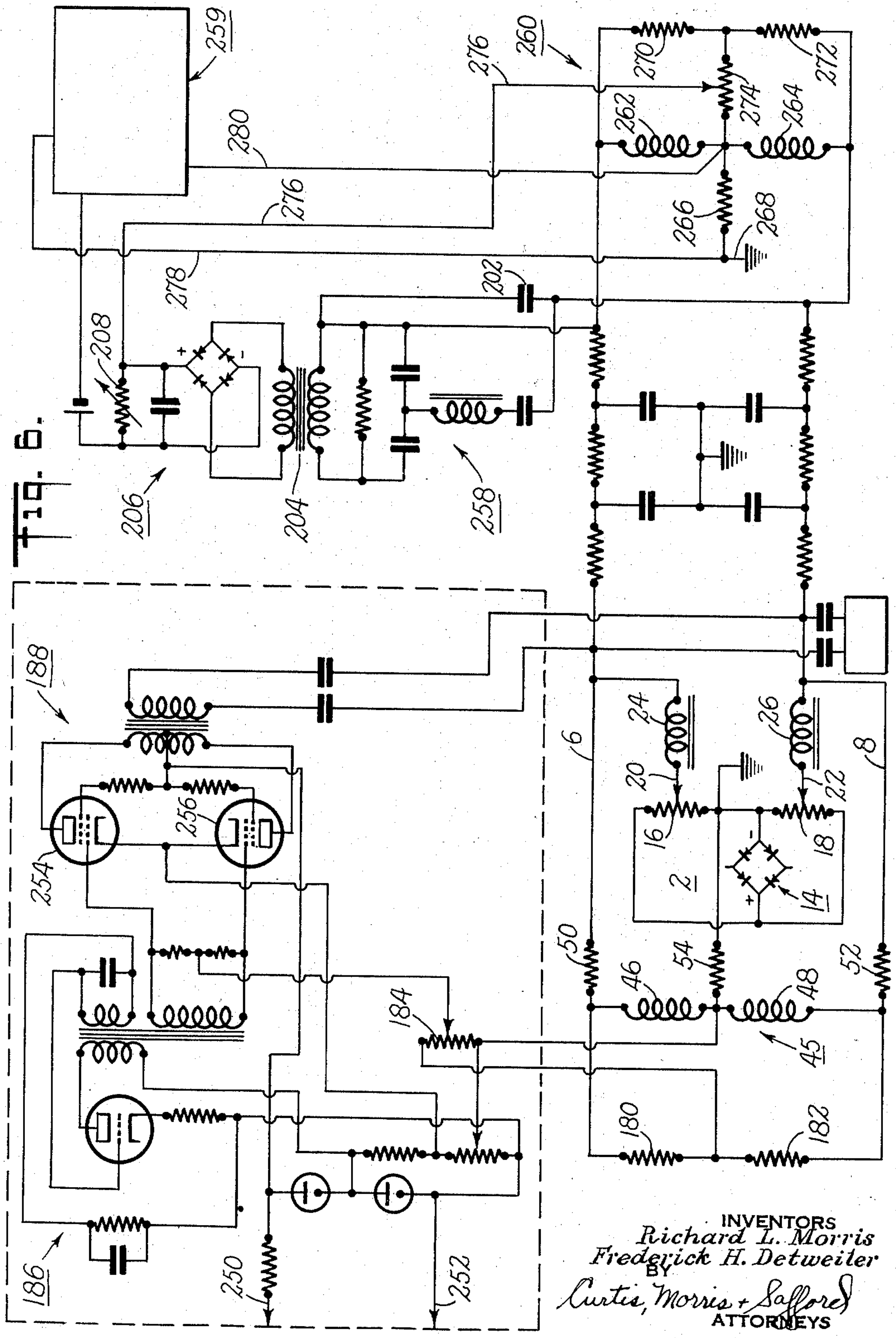
Figure 6 is a more detailed representation of the embodiment of Figure 5.

In the embodiments of Figures 1 to 4 the correction systems do not correct for potentials inducted into the lines or wires, or for the potential interference caused by leakage currents from adjacent electrical circuits. In the embodiments of Figures 5 and 6 these additional interference potentials are corrected for by applying the correction potentials at the receiving station or stations. In Figure 5 two signal transmitters are indicated at 160 and 162 and each is connected at one side to a ground connection 164. The other side of transmitter 160 is connected through a line 166 to a receiver 168 and this line has distributed resistance indicated at 170. Transmitter 162 is similarly connected through a line 172, which has distributed resistance 174, to a receiver 176, and there is mutual capacitance and capacitance to ground indicated at 178.

Transmitters 160 and 162 have monitor circuits formed respectively by high impedance resistors 180 and 182 and a common control resistor 184. At the transmitting station there is an 800 cycle oscillator 186 which transmits an 800 cycle signal through a modulator 188, a pair of lines 190 and 192, having condensers 194 and 196 therein, respectively, to lines 166 and 172. Modulator 188 has its control circuit connected across the control resistor 184 by a pair of lines 198 and 200, and the arrangement is such that the amplitude of the 800 cycle signal which is transmitted over lines 190 and 192 is controlled in accordance with the potential drop across resistor 184.

At the receiving station this 800 cycle signal is taken from lines 166 and 172 by a tuned circuit formed by a condenser 202 and a transformer 204 and this signal is amplified and demodulated in a demodulator 206 and impressed across a resistor 208. Resistor 208 is connected at one side through a bias battery 210 to a grid 212 of a tube 214 and at the other side, resistor 208 is connected to a line 215. Line 215 is connected to the juncture of a pair of resistors 216 and 218 which are in series across lines 166 and 172.

Resistors 216 and 218 have high resistance and they form monitor circuits for receivers 168 and 176. Connected to line 215 is a resistor 220, the other side of which is connected to a line 222. Line 222 is connected to the cathode 224 of tube 214, the plate 226 of which is connected through a resistor 228 to the positive side of a source of direct current. The negative side of this source is connected through a line 227 to a ground connection 229 having a battery 231 in series therewith; and, is connected also through a correction resistor 230 to line 222 which line is connected to the negative or grounded side of receivers 168 and 176.

Thus, a correction circuit is provided and the arrangement is such that the potential which appears across resistor 184 at the transmitting station is reproduced across resistor 208 in this correction circuit. The monitor circuits formed by resistors 216 and 218 are similar to the monitor circuits formed by resistors 180 and 182, and therefore, if no ground potential current is flowing the drop across resistor 220 is the same as the drop across resistor 208. With this condition no correction current flows through resistor 230. However, if ground potential interference appears, the bias of grid 212 changes and the proper correcting current flows through resistor 230.

In the embodiment of Figure 6 a telescriber system such as those of Figures 1 and 4 is provided with an arrangement for impressing the correction potentials at the receiving station. In Figure 6 the correction equipment is the same as that of Figure 5, but it is shown more in detail in Figure 6, and the push-pull correction arrangement of Figure 4 is used. The elements in Figure 6 corresponding to those of Figures 1, 4 and 5 are given corresponding numbers. In the upper left-hand portion of Figure 6 is shown schematically the 800 cycle oscillator 186 and at the right there is the amplitude modulator 188. These units receive power for a direct current source through lines 250 and 252. Modulator 188 has two tubes 254 and 256, and with their associated elements, they constitute an over-biased amplifier which normally passes a very small amount of the 800 cycle signal; i. e., it maintains a very low amplitude.

When a signal current flows through the monitor circuits and the control resistor 184, the grids of these tubes are rendered less negative so that the amplitude of the 800 cycle signal is transmitted through a filter circuit 258, and the tuned circuit formed by condenser 202 and transformer 204, to the demodulator 206. The signal then impressed across resistor 208 is transmitted to a push-pull correction unit 259 identical with that of Figure 4. The signal-responsive coils at the receiver 260 are indicated at 262 and 264, and they have a common terminal connected through a correction resistor 266 to a ground connection 268. The monitor circuits formed by high resistors 270 and 272 and a signal resistor 274 are connected respectively across the two signal circuits. A slide on resistor 274 is connected through a line 276 to one side of resistor 208, and lines 278 and 280 connect the push-pull correction unit 259 to the two sides of the correction resistor 266.

The amplitude of the correction signal output is substantially linear with respect to the signal voltage which appears on the control resistor 184, and a corresponding voltage equal in value is impressed on resistor 208 at the receiving station. If there is no ground potential interference, the potential of the left-hand end of resistor 208 is such with respect to the potential of line 280 that no correction potential is impressed on the correction resistor 266 by unit 259. However, if there is ground potential interference this will cause a change in the current flowing through the monitor circuits so that the potential of line 276 is changed and this causes the correction unit to impress the proper potential across resistance 266. Thus, the proper correction is impressed at the receiver between coils 262 and 264 and the ground connection 268.

As many possible embodiments may be made of the mechanical features of the above invention and as the art herein described might be varied in the various parts, all without departing from the scope of the invention, it is to be understood that all matter hereinabove set forth, or shown in the accompanying drawings is to be interpreted as illustrative and not in a limiting sense.

We claim:

1. In a telescriber system wherein there is a transmitter and a receiver and electrical circuit means connecting them with there being a tendency for the signals to be interfered with by stray electric currents, correction means for imposing a correction effect on the signals to compensate for the stray electric currents whereby substantially true signals are received by the receiver comprising: means constituting a monitor circuit at the transmitter by means of which a monitor potential is created which bears a direct relationship to the correct signal, means in series with the signal circuit which is adapted to produce a signal circuit potential which bears a relationship to the current flowing in the signal circuit and control means to compare the monitor potential with the signal circuit potential and to superimpose a correction potential in the signal circuit which is varied to produce the desired correction effect.

2. In a system as described in claim 1 which includes two signal circuits each of which has one side formed by a line and the other side formed by ground connections, and wherein the means to produce the monitor potential and the means to produce the signal circuit potential are resistors connected together at a common terminal, and wherein said control means is a control vacuum tube amplifier wherein the grid cathode circuit is connected across said resistors in series, and a correction resistor connected in the signal circuits and also in the cathode plate circuit of said vacuum tube.

3. A system as described in claim 2 which includes a battery having its positive side grounded and its negative side connected to said signal circuits in series therewith at said plate and cathode circuit whereby said plate and cathode circuit is maintained at a positive potential.

4. A system as described in claim 2 wherein each of said signal circuits has its own monitor circuit which corresponds electrically thereto and wherein said signal circuits receive current from a rectifier system including a pair of potentiometers.

5. A system as described in claim 2 wherein each of said signal circuits has its own monitor circuit formed by a resistor.

6. A system as described in claim 1 wherein said control means includes a push-pull correction potential source and three resistors one of which is a correction resistor in the signal circuit upon which a correction potential is impressed, another of which is a monitor potential resistor in the monitor circuit and the other of which is a signal circuit potential resistor in the signal circuit, and wherein the monitor potential resistor and the signal circuit potential resistor are connected in bucking relationship to control the magnitude of the correction potential.

7. In a telescriber system wherein there is a transmitter and a receiver and electrical circuit means connecting them with there being a tendency for the signals to be interfered with by stray electric currents, correction means for imposing a correction effect on the signals to compensate for the stray electric currents whereby substantially true signals are received by the receiver comprising: means constituting a monitor circuit at the transmitter by means of which a monitor potential is created which bears a direct relationship to the correct signal, and control means which includes an oscillator to produce a high frequency oscillation control signal, a modulator which varies said control signal in accordance with the magnitude of the monitor potential, and potential correcting means at the receiver including a demodulator and means responsive thereto to produce a potential corresponding in magnitude with said monitor potential.

8. In a system of the character described wherein there is a transmitter and a receiver and electrical means connecting them with there being ground connections whereby interference may be produced by ground potentials, correction means for imposing a correction effect on the signals to compensate for said interference whereby substantially true signals are received at the receiver comprising: circuit means constituting a monitor circuit at the transmitter by means of which a monitor potential is created which bears a direct relationship to the correct signal, resistor means in series with the signal circuit which is adapted to produce a signal circuit potential which bears a direct relationship to the current flowing in the signal circuit and control means to compare the monitor potential with the signal circuit potential and to superimpose a correction potential in the signal circuit which is varied to produce the desired correction effect.

9. A system as described in claim 8 which includes, a battery having one side grounded and its other side connected to said signal circuit in series therewith whereby the signal circuit is maintained at a fixed potential above ground so that the correction potential will be imposed from a fixed chosen polarity.

10. A system as described in claim 8 wherein said monitor circuit includes a control resistor similar to said resistor means, and which also includes a main monitor resistor, and wherein said control means comprises, a vacuum tube having its grid cathode circuit connected to said control resistor and said resistor means in reversed series whereby said monitor potential and said signal circuit potential are connected in bucking relationship, and a correction circuit resistor similar to said main resistor and connected in the cathode plate circuit of said vacuum tube and across whch said correction potential is impressed.

11. In a system of the character described for transmitting signals which are of a fixed polarity and wherein the rate of acceleration and deceleration and change in magnitude of the signal does not ordinarily exceed the rate of movement of the human hand, and wherein interference with the signals may be created by stray electric currents, correction means for imposing a correction effect on the signal so as to not interfere with the signals comprising: monitor means at the transmitting end of the system which creates a monitor potential which varies with the magnitude of the correct signal, correction resistor means in the signal circuit adapted to have a correction potential impressed across it, and means responsive to the magnitude of the monitor potential to impose a correction potential upon said correction resistor means which compensates substantially continuously for deviations between the actual signal and the correct signal.

RICHARD L. MORRIS.
FREDERICK H. DETWEILER.

REFERENCES CITED

The following references are of record in the file of this patent:

UNITED STATES PATENTS

| Number | Name | Date |
|---|---|---|
| 1,593,640 | Trueblood | July 27, 1926 |
| 2,039,404 | Green | May 5, 1936 |
| 2,159,927 | Cannon | May 23, 1939 |
| 2,338,399 | Bingley | Jan. 4, 1944 |
| 2,460,786 | Schock | Feb. 1, 1949 |

Certificate of Correction

Patent No. 2,561,401

July 24, 1951

RICHARD L. MORRIS ET AL.

It is hereby certified that error appears in the printed specification of the above numbered patent requiring correction as follows:

Column 4, line 9, for "receiving" read *receiver*; line 27, for "circiuts" read *circuits*; column 7, lines 33 and 34, for "inducted" read *induced*; column 10, line 72, for "whch" read *which*;

and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*